United States Patent
Eckel et al.

(10) Patent No.: US 6,441,068 B1
(45) Date of Patent: *Aug. 27, 2002

(54) FLAME-RESISTANT REINFORCED POLYCARBONATE ABS MOULDING MATERIALS

(75) Inventors: Thomas Eckel, Dormagen; Dieter Wittmann, Leverkusen; Bernd Keller, Geldern; Heinrich Alberts, Odenthal, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/485,341

(22) PCT Filed: Jul. 29, 1998

(86) PCT No.: PCT/EP98/04732

§ 371 (c)(1),
(2), (4) Date: Feb. 7, 2000

(87) PCT Pub. No.: WO99/07778

PCT Pub. Date: Feb. 18, 1999

(30) Foreign Application Priority Data

Aug. 11, 1997 (DE) .......................... 197 34 667

(51) Int. Cl.⁷ ................................ C08K 3/00

(52) U.S. Cl. ........................... 524/127; 525/67; 525/462

(58) Field of Search ................... 525/67, 462; 524/127

(56) References Cited

U.S. PATENT DOCUMENTS

| | | | | |
|---|---|---|---|---|
| 3,166,606 A | * | 1/1965 | Reinking et al. | |
| 4,186,154 A | * | 1/1980 | Binsack et al. | 525/461 |
| 4,983,658 A | * | 1/1991 | Kress et al. | 525/67 |
| 5,204,394 A | * | 4/1993 | Gosens et al. | 524/127 |
| 5,750,602 A | * | 5/1998 | Kohler et al. | 524/127 |
| 5,961,915 A | | 10/1999 | Toyouchi et al. | 264/572 |

OTHER PUBLICATIONS

RD 355030A, English Abstract, Nov. 10, 1993.*

* cited by examiner

Primary Examiner—Margarat Medley
(74) Attorney, Agent, or Firm—Joseph C. Gil; James R. Franks; Aron Preis

(57) ABSTRACT

A flame-resistant, reinforced thermoplastic molding composition characterized by its improved properties is disclosed. The composition contains A) a mixture of two aromatic polycarbonate resins that differ one from the other in terms of their relative solution viscosities, B) an optional vinyl (co)polymer containing at least one ethylenically unsaturated monomer, C) a graft polymer, D) a phosphorus compound, E) fluorinated polyolefin, and F) inorganic reinforcing material.

13 Claims, No Drawings

FLAME-RESISTANT REINFORCED POLYCARBONATE ABS MOULDING MATERIALS

CROSS REFERENCE TO RELATED PATENT APPLICATIONS

The present patent application claims the right of priority under 35 U.S.C. 119 and 35 U.S.C. 365 of International Application No. PCT/EP98/04732, filed Jul. 29, 1998, which was published in German as International Patent Application No. WO 99/07778 on Feb. 18, 1999, which is entitled to the right of priority of German Patent Application No. 197 34 667.7, filed Aug. 11, 1997.

The present invention relates to reinforced polycarbonate ABS moulding compositions flame-proofed with organic phosphorus compounds which have an excellent mechanical property level.

Reinforced flame-proofed polycarbonate ABS moulding compositions are already known.

Inter alia, EP-A-0 754 531 describes flame-proof moulding compositions consisting of polycarbonate, ABS graft polymer and optionally SAN copolymers which are reinforced with foliate inorganic materials.

Flame-proof polymer mixtures consisting of aromatic polycarbonate, styrene-containing copolymer and/or graft polymer, oligomeric phosphates as flame-proofing agents and fibres as reinforcing agents are known from EP-A-0 363 608.

The teaching of EP-A-0 640 655 relates to flame-proof moulding compositions consisting of aromatic polycarbonates, styrene-containing copolymers, graft polymers, and a mixture of mono- and oligomeric phosphates, which may optionally contain glass fibres as reinforcing materials.

For certain applications, such as for the production of moulded bodies with increased mechanical stress or for moulded bodies with thin wall thickness, the known moulding compositions exhibit an inadequate property level, particularly too little rigidity or insufficient flow behaviour.

The object of the present invention was therefore to provide flame-proof, reinforced polycarbonate ABS moulding compositions which have an excellent E modulus in addition to very good flame-proofness, very good processing properties and a high mechanical property level.

Surprisingly it has now been found that by the use of certain mixtures of polycarbonates, each with distinctly different solution viscosities, polycarbonate ABS moulding compositions result which have a distinctly better E modulus, higher notch impact strength and better processing behaviour than moulding compositions which contain as polycarbonate component only a polycarbonate with a corresponding average solution viscosity.

The invention therefore provides flame-proof, reinforced thermoplastic moulding compositions, containing A. 5 to 95, preferably 10 to 90, particularly preferably 20 to 80 parts by weight of a mixture of two aromatic polycarbonates A.1 and A.2 with different solution viscosity, wherein
  1. the relative solution viscosity of A.1 is 1.18 to 1.24,
  2. the relative solution viscosity of A.2 is 1.24 to 1.34 and
  3. the difference between the relative solution viscosities of A.1 and A.2 is not less than 0.06,
  wherein one or more further polycarbonates may be added to the mixture of A.1 and A.2, B. 0 to 50, preferably 1 to 30, particularly preferably 2 to 25 parts by weight of a vinyl (co)polymer consisting of one or at least two ethylenically unsaturated monomers, C. 0.5 to 60, preferably 1 to 40, particularly preferably 2 to 30 parts by weight of graft polymer with a glass transition temperature $<-10°$ C. obtainable by graft polymerization of at least two of the monomers selected from chloroprene, butadiene, isoprene, styrene, acrylonitrile, ethylene, propylene, vinyl acetate and (meth)acrylic acid ester with 1 to 18 C atoms in the alcohol component, D. 0.5 to 20 parts by weight, preferably 1 to 18 parts by weight, particularly preferably 2 to 15 parts by weight, of phosphorus compound of formula (I)

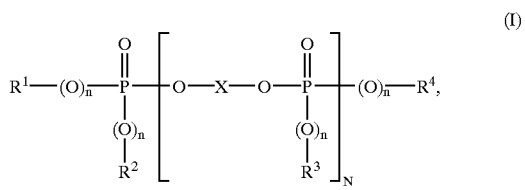

in which $R^1$, $R^2$, $R^3$ and $R^4$ independently of each other mean optionally halogenated $C_1-C_4$-alkyl, $C_5-C_6$-cycloalkyl, $C_6-C_{20}$-aryl or $C_7-C_{12}$-aralkyl, optionally substituted by halogen and/or $C_1-C_4$-alkyl in each case, n independently of each other means 0 or 1, N means 0 to 30 and X means a mono- or polynuclear aromatic group with 6 to 30 C atoms, E 0.05 to 5 parts by weight, preferably 0.1 to 1 part by weight, particularly preferably 0.1 to 0.5 parts by weight of fluorinated polyolefin and F. 1 to 40, preferably 3 to 30, particularly preferably 5 to 20 parts by weight of inorganic, preferably fibrous reinforcing material.

The sum of all parts by weight A+B+C+D+E+F is 100.

Component A

Thermoplastic aromatic polycarbonates suitable according to the invention as Component A are those based on diphenols of formula (II)

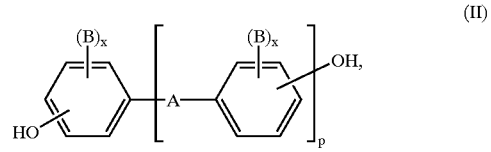

in which

A means a single bond, $C_1-C_5$-alkylene, $C_2-C_5$-alkylidene, $C_5-C_6$-cycloalkylidene, —S—, —SO$_2$—, —O—, —CO— or a $C_6-C_{12}$-arylene group which may optionally be condensed with further aromatic rings containing heteroatoms, B independently of each other means in each case $C_1-C_8$-alkyl, preferably methyl, ethyl, $C_6-C_{10}$-aryl, preferably phenyl, $C_7-C_{12}$-aralkyl, preferably benzyl, halogen, preferably chlorine, bromine, x independently of each other means 0, 1 or 2 in each case and p means 1 or 0, or alkyl-substituted dihydroxyphenyl cycloalkanes of formula (III)

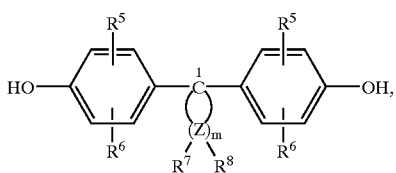

in which
R$^5$ and R$^6$ independently of each other, in each case mean hydrogen, halogen, preferably chlorine or bromine, C$_1$–C$_8$-alkyl, preferably methyl, ethyl, C$_5$–C$_6$-cycloalkyl, C$_6$–C$_{10}$-aryl, preferably phenyl, and C$_7$–C$_{12}$-aralkyl, preferably phenyl-C$_1$–C$_4$-alkyl, particularly benzyl,
m means a whole number from 4 to 7, preferably 4 or 5,
R$^7$ and R$^8$ individually selectable for each Z and independently of each other mean hydrogen or C$_1$–C$_6$-alkyl, preferably hydrogen, methyl or ethyl, and
Z means carbon, with the proviso that R$^7$ and R$^8$ simultaneously mean alkyl on at least one atom Z.

Examples of suitable diphenols of formula (II) are hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dibromo-4-hydroxyphenyl)-propane.

Preferred diphenols of formula (II) are 2,2-bis-(4-hydroxyphenyl)-propane, 2,2-bis-(3,5-dichloro-4-hydroxyphenyl)-propane and 1,1-bis-(4-hydroxyphenyl)-cyclohexane.

Preferred diphenols of formula (III) are dihydroxydiphenylcycloalkanes with 5 and 6 ring C atoms in the cycloaliphatic group [(m=4 or 5 in formula (III)] such as diphenols of the following formulae, for example:

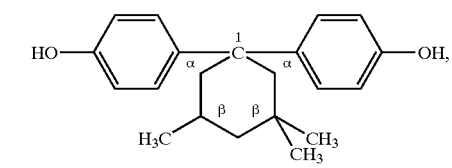

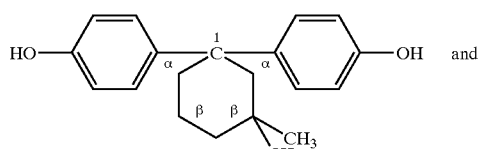

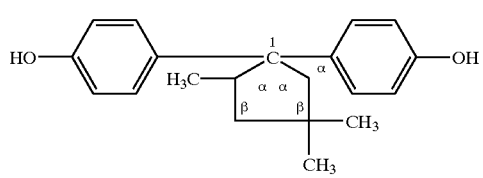

wherein the 1,1-bis-(4-hydroxyphenyl)-3,3,5-trimethylcyclohexane (Formula IIIa) is particularly preferred.

The polycarbonates suitable according to the invention according to Component A may be branched in known manner, and indeed preferably by the incorporation of 0.05 to 2.0 mol %, related to the sum of the diphenols used, of tri- or more than trifunctional compounds, such as those with three or more than three phenolic groups, examples of which are:
phloroglucinol,
4,6-dimethyl-2,4,6-tri-(4-hydroxyphenyl)-heptene-2,
4,6-dimethyl-2,4,6-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2-bis-(4,4-bis-(4-hydroxyphenyl)-cyclohexyl)-propane,
2,4-bis-((4-hydroxyphenyl)-isopropyl)-phenol,
2,6-bis-(2-hydroxy-5'-methyl-benzyl)-4-methylphenol,
2-(4-hydroxyphenyl)-2-(2,4-dihydroxyphenyl)-propane,
hexa-(4-(4-hydroxyphenyl-isopropyl)-phenyl)-ortho-terephthalic acid ester,
tetra-(4-hydroxyphenyl)-methane,
tetra-(4-(4-hydroxyphenyl-isopropyl)-phenoxy)-methane and
1,4-bis-((4',4"-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

In addition to the bisphenol A homopolycarbonate, preferred polycarbonates are the copolycarbonates of bisphenol A with up to 15 mol %, related to the mol sum of diphenols, of 2,2-bis-(3,5-dibromo-4-hydroxyphenyl)-propane.

The aromatic polycarbonates of Component A may be partially replaced by aromatic polyester carbonates.

The aromatic polycarbonates of Component A may also contain polysiloxane blocks. Their manufacture is described, for example, in DE-OS 33 34 872 and U.S. Pat. No. 3,821,325.

Aromatic polycarbonates and/or aromatic polyester carbonates according to Component A are known in the literature or can be produced by processes known in the literature (on the production of aromatic polycarbonates see, for example, Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396; on the production of aromatic polyester carbonates see DE-OS 3 077 934 for example).

Aromatic polycarbonates and/or aromatic polyester carbonates can be produced for example by reacting diphenols with carbonic acid halides, preferably phosgene and/or with aromatic dicarboxylic acid dihalides, preferably benzene dicarboxylic acid dihalides, by the phase interface process, optionally with use of the chain terminators and optionally with use of the trifunctional or more than trifunctional branching agents.

Related to the mixture of polycarbonates A.1 and A.2, the A.1 content is 5 to 95, preferably 25 to 75 wt. %, particularly 35 to 65 wt. %, and the A.2 content by weight is 95 to 5, preferably 75 to 25 wt. %, particularly 65 to 35 wt. %.

The mixture of polycarbonates A.1 and A.2 is distinguished in that the relative solution viscosity of A.1 is 1.18 to 1.24, that the relative solution viscosity of A.2 is 1.24 to 1.34 and that the difference between the relative solution viscosities of A.1 and A.2 is not less than 0.06, particularly not less than 0.09, i.e. relative solution viscosity (A.2) minus relative solution viscosity (A.1) ≧0.06, particularly ≧0.09. The relative solution viscosity is measured in CH$_2$Cl$_2$ as solvent at 25° C. at a concentration of 0.5 g/100 ml.

Preferably the polycarbonates A.1 and A.2 have the same structures, i.e. they are synthesized from the same monomers. It is particularly preferred that both the polycarbonates A.1 and A.2 and further added polycarbonate (as described above for A.1 and A.2) are synthesized from the same monomers and have the same structure. A further polycarbonate is preferably added up to a quantity of 30 wt. % (related to the quantity of A.1 and A.2).

One or both polycarbonate constituents A.1 or A.2 in the mixture may be a recycled polycarbonate. Recycled polycarbonate is intended to mean those products which have already experienced a processing and life cycle and have been subject to specific re-processing processes to remove adherent contaminants to such an extent that they are suitable for further uses.

Component B

The thermoplastic polymer B, which is optionally present in the moulding compositions according to the invention, comprises (co)polymers of one or at least two ethylenically unsaturated monomers (vinyl monomers) such as styrene, α-methylstyrene, styrenes substituted in the ring (e.g. halogen and/or alkyl ring-substituted), acrylonitrile, methacrylonitrile, melhyl methacrylate, maleic anhydride, N-substituted maleinimides and (meth)acrylic acid esters with 1 to 18 C atoms in the alcohol component.

The (co)polymers according to Component B are resin-like, thermoplastic and rubber-free. The moulding composition may also contain various (co)polymers B.

Preferred vinyl (co)polymers B are those consisting of at least one monomer from the series styrene, α-methylstyrene and/or ring-substituted styrene and/or methyl methacrylate (B.1) with at least one monomer from the series acrylonitrile, methacrylonitrile, methyl methacrylate, maleic anhydride and/or N-alkyl- and N-arylsubstituted maleinimide (B.2).

The monomer B.1 content of the (co)polymer is preferably 50 to 99, particularly preferably 60 to 95 wt. %, that of monomer B.2, preferably 1 to 50, particularly preferably 40 to 5 wt. %.

Particularly preferred copolymers B are those consisting of styrene with acrylonitrile and optionally with methyl methacrylate, of α-methylstyrene with acrylonitrile and optionally with methyl methacrylate, or of styrene and α-methylstyrene with acrylonitrile and optionally with methyl methacrylate.

The (co)polymers according to Component B are known and may be produced by radical polymerization, particularly by emulsion, suspension, solution or bulk polymerization. The copolymers according to Component B preferably have molecular weights $\overline{M}_w$ (weight average, determined by light scattering or sedimentation) between 15,000 and 200,000.

Particularly preferred copolymers B according to the invention are also statistically synthesized copolymers of styrene and maleic anhydride which may preferably be produced from the corresponding monomer by a continuous bulk or solution polymerization with incomplete reactions.

The contents of the two components of the statistically synthesized styrene/maleic anhydride copolymers suitable according to the invention may be varied within wide limits. The preferred maleic anhydride content is 5 to 25 wt. %.

Instead of styrene, the polymers may also contain ring-substituted styrenes, such as p-methylstyrene, 2,4-dimethylstyrene and other substituted styrenes such as α-methylstyrene.

The molecular weights (number average $\overline{M}_n$) of the statistically synthesized styrene/maleic anhydride copolymers suitable according to the invention according to Component B may vary over a wide range. The preferred range is 60,000 to 200,000. An intrinsic viscosity of 0.3 to 0.9 (measured in dimethyl formamide at 25° C; see Hoffmann, Kromer, Kuhn, Polmeranalytik I, Stuttgart 1977, p. 316 ff.) is preferred for these products.

Component C

Component C according to the invention represents graft polymers which the moulding composition may also contain as a mixture. These comprise graft copolymers with rubber-elastic properties, which are substantially obtainable from at least two of the following monomers: chloroprene, buta-1, 3-diene, isopropene, styrene, acrylonitrile, ethylene, propylene, vinyl acetate and (meth)acrylic acid ester with 1 to 18 C atoms in the alcohol component; i.e. polymers as are described, for example, in "Methoden der organischen Chemie" (Houben-Weyl), Vol. 14/1, Georg Thieme Verlag publishers, Stuttgart 1961, p. 393–406 and in C. B. Bucknall, "Toughened Plastics", Appl. Science Publishers, London 1977. Preferred polymers C are partially crosslinked and contain gel contents of over 20 wt %, preferably over 40 wt. %, particularly over 60 wt. %.

Preferred graft polymers C comprise graft polymers consisting of:

C.1 5 to 95, preferably 30 to 80 parts by weight of a mixture comprising

C.1.1 50 to 99 parts by weight of styrene, α-methylstyrene, halogen or methyl ring-substituted styrenes, methyl methacrylate or mixtures of these compounds and C.1.2 1 to 50 parts by weight of acrylonitrile, methacrylonitrile, methyl methacrylate, maleic anhydride, $C_1$–$C_4$-alkyl and/or phenyl-N-substituted maleinimides or mixtures of these compounds on C.2 5 to 95, preferably 20 to 70 parts by weight of polymer based on diene and/or alkyl acrylate with a glass transition temperature below −10° C.

Examples of preferred graft polymers C are bases C.2 grafted with styrene and/or acrylonitrile and/or alkyl (meth) acrylates such as polybutadienes, butadiene/styrene copolymers and acrylate rubbers; i.e. copolymers of the type described in DE-OS 1 694 173 (=U.S. Pat. No. 3,564,077); polybutadienes, butadiene/styrene or butadiene/acrylonitrile copolymers, polyisobutenes or polyisoprenes grafted with alkyl acrylates or methacrylates, vinyl acetate, acrylonitrile, styrene and/or other alkyl styrenes, such as are described in DE-OS 2 348 377 (=U.S. Pat. No. 3,919,353).

Examples of particularly preferred polymers C are ABS polymers such as are described in DE-OS 2 035 390 (=U.S. Pat. No. 3,644,574) or in DE-OS 2 248 242 (=GB-PS 1 409 275) for example.

Particularly preferred graft polymers C are obtainable by gratification of

α10 to 70, preferably 15 to 50, particularly 20 to 40 wt. %, relative to the graft polymer C, of at least one (meth) acrylic acid ester or 10 to 70, preferably 15 to 50, particularly 20 to 40 wt. % of a mixture consisting of 10 to 50, preferably 20 to 35 wt. %, relative to the mixture, of acrylonitrile or (meth)acrylic acid ester and 50 to 90, preferably 65 to 80 wt. %, relative to the mixture, of styrene, as graft shell C.1 on β30 to 90, preferably 50 to 85, particularly 60 to 80 wt. %, relative to the graft polymer C, of a butadiene polymer with at least 50 wt. %, relative to β, of butadiene groups as graft base C.2, wherein preferably the gel content of the graft base β is at least 70 wt. % (measured in toluene), the degree of graft G is 0.15 to 0.55 and the average particle diameter $d_{50}$ of the graft polymer C.2 is 0.05 to 2 μm, preferably 0.1 to 0.6 μm.

(Meth)acrylic acid esters α are esters of acrylic acid or methacrylic acid with monohydric alcohols with 1 to 18 C atoms. Methacrylic acid methyl, ethyl and propyl esters, n-butyl acrylate, t-butyl acrylate and t-butyl methacrylate are particularly preferred.

In addition to butadiene groups the graft base P may contain up to 50 wt. %, related to β, of groups of other ethylenically unsaturated monomers such as styrene, acrylonitrile, esters of acrylic or methacrylic acid with 1 to 4 C atoms in the alcohol component (such as methyl acrylate, ethyl acrylate, methyl methacrylate, ethyl methacrylate), vinyl esters and/or vinyl ethers. The preferred graft base β consists of pure polybutadiene.

The degree of graft G denotes the weight ratio between grafted graft monomers and graft base and is dimensionless.

The average particle size $d_{50}$ is the diameter above and below which 50 wt. % of the particles lie in each case. It may be determined by ultracentifuge measurement (W. Scholtan, H. Lange, Kolloid, Z. und Z. Polymere 250 (1972), 782–796).

Examples of particularly preferred polymers C are graft polymers comprising

τ. 20 to 90 wt. %, relative to Component C, of acrylate rubber with a glass transition temperature <−20° C. as graft base C.2 and δ. 10 to 80 wt. %, relative to Component C, of at least one polymerizable ethylenically unsaturated monomer as graft monomer C.1.

The acrylate rubbers τ of polymers C are preferably polymers of acrylic acid alkyl esters, optionally with up to 40 wt. %, relative to τ, of other polymerizable ethylenically unsaturated monomers. $C_1$–$C_8$-alkyl esters, such as methyl, ethyl, butyl, n-octyl and 2-ethyl hexylester; halogen alkyl esters, preferably halogen-$C_1$–$C_8$-alkyl esters, such as chloroethyl acrylate, and mixtures of these monomers, belong to the preferred polymerizable acrylic acid esters.

For crosslinking, monomers with more than one polymerizable double bond may be copolymerized. Preferred examples of crosslinking monomers are esters of unsaturated monocarboxylic acids with 3 to 8 C atoms and unsaturated monohydric alcohols with 3 to 12 C atoms or saturated polyols with 2 to 4 OH groups and 2 to 20 C atoms, such as ethylene glycol dimethacrylate, allyl methacrylate; polyunsaturated heterocyclic compounds such as trivinyl and triallyl cyanurate; polyfunctional vinyl compounds such as di- and tri-vinyl benzenes; but also triallyl phosphate and diallyl phthalate.

Preferred crosslinking monomers are allyl methacrylate, ethylene glycol dimethyl-acrylate, diallyl phthalate and heterocyclic compounds which have at least three ethylenically unsaturated groups.

Particularly preferred crosslinking monomers are the cyclic monomers triallyl cyanurate, triallyl isocyanurate, trivinyl cyanurate, triacryloylhexahydro-s-triazine, triallyl benzenes.

The quantity of crosslinking monomers is preferably 0.02 to 5, particularly 0.05 to 2 wt. %, related to the graft base .

In the case of cyclic crosslinking monomers with at least three ethylenically unsaturated groups it is advantageous to limit the quantity to below 1 wt. % of the graft base τ.

Examples of preferred "other" polymerizable, ethylenically unsaturated monomers which may optionally also serve to produce the graft base τ in addition to the acrylic acid esters, are acrylonitrile, styrene, α-methylstyrene, acrylamides, vinyl-$C_1$–$C_6$-alkylethers, methyl methacrylate, butadiene. Preferred acrylate rubbers as graft base τ are emulsion polymers which have a gel content of at least 60 wt. %.

Further suitable graft bases according to C.2 are silicone rubbers with graft-active sites, such as are described in DE-OS 3 704 657, DE-OS 3 704 655, DE-OS 3 631 540 and DE-OS 3 631 539.

The gel content of the graft base C.2 is determined at 25° C. in dimethyl formamide (M. Hoffmann, H. Kromer, R. Kuhn, Polymeranalytik I and II, George Thieme-Verlag publishers, Stuttgart 1977).

The graft polymers C may be produced by known processes such as bulk, suspension, emulsion or bulk-suspension processes.

Since in the graft reaction, the graft monomers are not necessarily completely grafted onto the graft base, as is known, according to the invention graft polymers C are also understood to mean those products which are obtained by polymerization of the graft monomers in presence of the graft base.

Component D

As flame-proofing agent the moulding compositions according to the invention contain at least one organic phosphorus compound and/or a mixture of organic phosphorus compounds of formula (I)

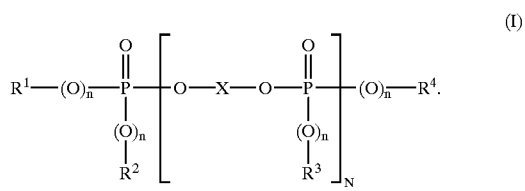

In the formula, $R^1$, $R^2$, $R^3$ and $R^4$ have the meanings given above. Preferably $R^1$, $R^2$ $R^3$ and $R^4$ independently of each other stand for $C_1$–$C_4$-alkyl, phenyl, naphthyl or phenyl-$C_1$–$C_4$-alkyl. For their part the aromatic groups $R^1$, $R^2$, $R^3$ and $R^4$ may be substituted with halogen, preferably chlorine or bromine, and/or alkyl groups, preferably $C_1$–$C_4$-alkyl, e.g. methyl, ethyl. Particularly preferred aryl groups are cresyl, phenyl, xylenyl, propylphenyl or butylphenyl and the corresponding brominated and chlorinated derivatives thereof.

In formula (I) X means a mono- or polynuclear aromatic group with 6 to 30 C atoms. This is preferably derived from diphenols according to formula (II) such as bisphenol A, resorcinol or hydroquinone or their chlorinated or brominated derivatives.

In formula (I), independently of each other n may be 0 or 1, preferably n is equal to 1.

N stands for values of 0 to 30, preferably 0.3 to 20, particularly preferably 0.5 to 10, particularly 0.5 to 6.

In mixtures of phosphorus compounds N assumes an average value of 0 to 30, preferably 0.3 to 20, particularly preferably 0.5 to 10, particularly 0.5 to 6.

This mixture may contain monophosphorus compounds and/or oligomeric and/or polymeric phosphorus compounds.

Where N=0, formula (I) describes monophosphorus compounds.

Organic monophosphates such as tributyl phosphate, tris-(2-chloroethyl)-phosphate, tris-(2,3-dibromopropyl)-phosphate, triphenyl phosphate, tricresyl phosphate, diphenylcresyl phosphate, diphenyloctyl phosphate, diphenyl-2-ethylcresyl phosphate, tri-(isopropylphenyl)-phosphate, halogen-substituted aryl phosphates, methyl phosphonic acid dimethyl esters, methyl phosphonic acid diphenyl esters, phenyl phosphonic acid diethyl esters, triphenyl phosphine oxide or tricresyl phosphine oxide and/or mixtures thereofare used in particular as phosphorus compound of Formula (I).

Monomeric and oligomorus phosphorus compounds of formula (I) in the mixture are preferably selected in such a way that a synergistic effect is obtained. The mixture generally consists of 10 to 90 wt. % of oligomeric and 90 to 10 wt. % of monophosphorus compounds, preferably monophosphate compounds of formula (I). Preferably the monophosphorus compounds are mixed in the range from 12 to 50, particularly 14 to 40, quite particularly preferably 15 to 40 wt. %, with the complementary quantity of oligomeric phosphorus compounds.

Component E

The fluorinated polyolefins E are high-molecular and have glass transition temperatures of above −30° C., generally above 100° C. fluorine contents preferably of 65 to 76, particularly 70 to 76 wt. %, average particle diameters $d_{50}$ of 0.05 to 1,000, preferably 0.08 to 20 μm. Generally speaking the fluorinated polyolefins E have a density of 1.2 to 2.3 g/cm$^3$.

Preferred fluorinated polyolefins E are polytetrafluoroethylene, polyvinylidene fluoride, tetrafluoroethylene/hexafluoropropylene and ethylene/tetrafluoroethylene copolymers. The fluorinated polyolefins are known (cf. "Vinyl and Related Polymers" by Schildknecht, John Wiley & Sons, Inc., New York, 1962, page 484 to 494; "Fluorpolymers" by Wall, Wiley Interscience, John Wiley & Sons, Inc., New York, Vol. 13, 1970, page 623 to 654; "Modern Plastics Encyclopedia", 1970 to 1971, Vol. 47, No. 10A, October 1970, McGraw-Hill, Inc., New York page 134 and 774; "Modem Plastics Encyclopedia", 1975 to 1976, October 1975, Vol. 52, No. 10A, McGraw-Hill, Inc., New York, page 27, 28 and 472 and U.S. Pat. Nos. 3,671,487, 3,723,373 and 3,838,092).

They may be produced by known processes, such as by polymerization of tetrafluoroethylene in aqueous medium with a catalyst forming free radicals, such as sodium, potassium or ammonium peroxydisulfate at pressures of 7 to 71 kg/cm$^2$ and at temperatures of 0 to 200° C., preferably at temperatures of 20 to 100° C. (For further details see U.S. Pat. No. 2,393,967 for example). Depending on the form of use, the density of these materials may be between 1.2 and 2.3 g/cm$^3$, the average particle size between 0.05 and 1,000 μm.

Fluorinated polyolefins E preferred according to the invention are tetrafluoroethylene polymers and have average particle diameters of 0.05 to 20 μm, preferably 0.08 to 10 μm, and a density of 1.2 to 1.9 g/cm$^3$. They are preferably used in the form of a coagulated mixture of emulsions of the tetrafluoroethylene polymers E with emulsions of the graft polymers C.

Suitable fluorinated polyolefins E which can be used in powder form are tetrafluoroethylene polymers with average particle diameters of 100 to 1,000 μm and densities of 2.0 g/cm$^3$ to 2.3 g/cm$^3$.

To produce a coagulated mixture of C and E, initially an aqueous emulsion (latex) of a graft polymer C with average latex particle diameters of 0.05 to 2 μm, particularly 0.1 to 0.6 μm, is mixed with a finely divided emulsion of a fluorinated polyolefin E in water with average particle diameters of 0.05 to 20 μm, particularly 0.08 to 10 μm; suitable tetrafluoroethylene polymer emulsions conventionally have solids contents of 30 to 70 wt. %, particularly 50 to 60 wt. %.

The aqueous emulsion of the graft polymer C has solids contents of 25 to 60 wt. %, preferably 30 to 45 wt. %, particularly 30 to 35 wt. %.

The quantity quoted in the description of Component C does not include the content of the graft polymer in the coagulated mixture of graft polymer and fluorinated polyolefins.

In the emulsion mixture the weight ratio of graft polymer C to fluorinated polyolefin E is 95:5 to 60:40. The emulsion mixture is coagulated in known manner, such as by spray-drying, freeze-drying or coagulation by adding inorganic or organic salts, acids, bases or organic solvents miscible with water, such as alcohols, ketones, preferably at temperatures of 20 to 150° C., particularly 50 to 100° C. If required, drying may take place at 50 to 200° C., preferably 70 to 100° C.

Suitable tetrafluoroethylene polymer emulsions are conventional commercial products and are offered as Teflon® 30 N by DuPont, for example.

Component F

Inorganic reinforcing materials such as glass fibres, optionally cut of ground, glass beads, glass marbles, foliate reinforcing material such as kaolin, talc, mica, carbon fibres or a mixture thereof are used as Component F. Cut or ground glass fibres, preferably with a length of 1 to 10 mm and a diameter of <20 μm are preferably used as reinforcing material in a quantity of 1 to 40 parts by weight; the glass fibres are preferably surface-treated.

The moulding compositions according to the invention may further contain at least one of the conventional additives, such as lubricants and mould release agents, nucleating agents, anti-static agents, stabilizers as well as dyes and pigments.

The moulding compositions according to the invention may, moreover, further contain finely divided inorganic powders in a quantity up to 50 parts by weight, preferably up to 20, particularly 0.5 to 10 parts by weight.

Finely divided inorganic compounds consist of compounds of one or more metals of main groups 1 to 5 or sub-groups I to 8 of the periodic system, preferably main groups 2 to 5 or sub-groups 4 to 8, particularly preferably main groups 3 to 5 or sub-groups 4 to 8 with at least one element selected from the group consisting of oxygen, sulfur, boron, phosphorus, carbon, nitrogen, hydrogen or silicon.

Examples of preferred compounds are oxides, hydroxides, hydrous oxides, sulfates, sulfites, sulfides, carbonates, carbides, nitrates, nitrites, nitrides, borates, silicates, phosphates, hydrides, phosphites or phosphonates.

Examples of preferred finely divided inorganic compounds are TiN, TiO$_2$, SnO$_2$, WC, ZnO, Al$_2$O$_3$, AlO(OH), ZrO$_2$, Sb$_2$O$_3$, SiO$_2$, iron oxides, Na$_2$SO$_4$, BaSO$_4$, vanadium oxides, zinc borate, silicates such as Al silicates, Mg silicates, one, two, three dimensional silicates, mixtures and doped compounds may also be used. Furthermore these nano-scale particles may be surface-modified with organic molecules, to obtain better compatibility with the polymers. Hydrophobic or hydrophilic surfaces may be produced in this way.

The average particle diameters are not greater than 200 nm, preferably not greater than 150 nm, particularly 1 to 100 nm.

Throughout, particle size and particle diameter mean the average particle diameter $d_{50}$ determined by ultracentrifuge measurements according to W. Scholtan et al., Kolloid-Z. und Z. Polymere 250 (1972), p. 782 to 796.

The inorganic compounds may be present as powders, pastes, sols, dispersions or suspensions. Powders may be obtained from dispersions, sols or suspensions by precipitation.

The powders may be incorporated into the thermoplastic plastics by conventional methods, such as by direct mixing or extrusion of the constituents of the moulding compositions and the finely divided inorganic powders. Preferred methods are the production of a masterbatch, e.g. in flame-proofing additives, other additives, monomers, solvents, in Component A or the co-precipitation of dispersions of the graft rubbers with dispersions, suspensions, pastes or sols of the finely divided inorganic materials.

The moulding compositions according to the invention may contain 0.01 to 20 wt. %, relative to the total moulding composition, of a further, optionally synergistically acting flame-proofing agent. Examples of compounds suitable as further flame-proofing agents are organic halogen compounds such as decabromobisphenylether, tetrabromobisphenol, inorganic halogen compounds such as ammonium bromide, nitrogen compounds such as melamine, melamine formaldehyde resins, inorganic hydroxide compounds such as Mg, Al hydroxide, inorganic compounds such as aluminium oxides, titanium dioxides, antimony oxides, barium metaborate, hydroxoantimonate, zirconium oxide, zirconium hydroxide, molybdenum oxide, ammonium molybdate, zinc borate, ammonium borate, and tin oxide as well as siloxane compounds.

The moulding compositions according to the invention containing Components A to F and optionally further known additives such as stabilizers, dyes, pigments, lubricants and mould release agents, nucleating agents and anti-static agents are produced by mixing the particular constituents in known manner and melt-compounding and melt-extruding them at temperatures of 200° C. to 300° C. in conventional equipment such as internal mixers, extruders and twin screw extruders, wherein Component E is preferably used in the form of the above-mentioned coagulated mixture. Extruders and twin screw extruders are preferred items of equipment.

The individual constituents may be mixed in known manner both successively and simultaneously, and at both approx. 20° C. (room temperature) and at higher temperature.

The moulding compositions of the present invention may be used to produce moulded bodies by injection moulding. Examples of moulded bodies which can be produced are: housing components of all kinds, such as for domestic appliances such as juicers, coffee machines, mixers, for office machines such as monitors, printers, copiers or cover panels for the building sector and components for the motor vehicle sector. They are also used in the field of electrical engineering because they have very good electrical properties.

A further form of processing is the production of moulded bodies by thermoforming from previously produced sheets or films.

Because of their excellent flameproofness, their very good processing property and their very good mechanical properties, particularly their outstanding rigidity, the thermoplastic moulding compositions according to the invention are suitable for the production of moulded bodies of all kinds, particularly those with increased demands as regards fracture strength.

The present invention therefore also provides the use of the moulding compositions according to the invention to produce moulded bodies of all kinds, preferably those mentioned above, as well as the moulded bodies made of the moulding compositions according to the invention.

EXAMPLES

Component A

A

Linear polycarbonate based on bisphenol A with a relative solution viscosity of 1.249, measured in $CH_2Cl_2$ as solvent at 25° C. and a concentration of 0.5 g/100 ml.

A.1

Linear polycarbonate based on bisphenol A with a relative solution viscosity of 1.26, measured in $CH_2Cl_2$ as solvent at 25° C. and in a concentration of 0.5 g/100 ml.

A.2

Linear polycarbonate based on bisphenol A with a relative solution viscosity of 1.19, measured in $CH_2Cl_2$ as solvent at 25° C. and in a concentration of 0.5 g/100 ml.

Component C

Graft polymer of 45 parts by weight of a copolymer consisting of styrene and acrylonitrile in the ratio of 72:28 on 55 parts by weight of particulate crosslinked polybutadiene rubber (average particle diameter $d_{50}=0.4$ μm), produced by emulsion polymerization.

Component D

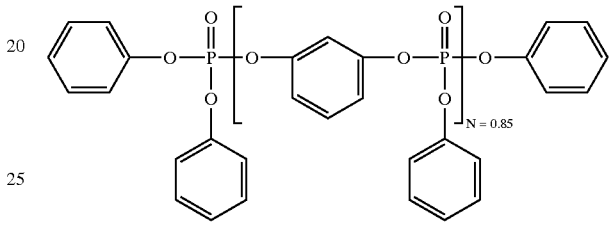

Component E

Tetrafluoroethylene polymer as coagulated mixture consisting of a graft polymer emulsion according to Component C in water and a tetrafluoroethylene polymer emulsion in water. The weight ratio of graft polymer C to tetrafluoroethylene polymer E in the mixture is 90 wt. % to 10 wt %. The tetrafluoroethylene polymer emulsion has a solids content of 60 wt. %, the average particle diameter is between 0.05 and 0.5 μm. The SAN graft polymer emulsion has a solids content of 34 wt. % and an average latex particle diameter of 0.4 μm.

Production of E

The emulsion of the tetrafluoroethylene polymer (Teflon 30 N, DuPont) is mixed with the emulsion of the graft polymer C and stabilized with 1.8 wt. %, related to polymer solids, of phenolic anti-oxidants. At 85 to 95° C. the mixture is coagulated with an aqueous solution of $MgSO_4$ (Epsom salts) and acetic acid at pH 4 to 5, filtered and washed until virtually electrolyte-free; the majority of the water is then removed by centrifuging and the mixture is then dried to a powder at 100° C. This powder may then be compounded with the further components in the equipment described.

Component F

Glass fibres (CS 7942, Bayer AG, Leverkusen, Germany) (cut, average length 4.5 mm).

Producing and testing the moulding compositions according to the invention

Components A to F are mixed with the conventional processing auxiliary substances on a ZSK 32 twin screw extruder. The moulded bodies are produced on an Arburg 270E type injection moulding machine at 260° C.

Notch impact strength is determined according to ISO method 180 1A on rods of dimensions 80×10×4 $mm^3$ at room temperature.

Heat deflection temperature according to Vicat B is determined to DIN 53 460 on rods of dimensions 80×10×4 $mm^3$.

Tensile E modulus is determined according to ISO 527/DIN 53 457.

Flame resistance is determined according to UL94V.

The fire behaviour of the samples is measured according to UL-Subj.94V on rods of dimensions 127 mm×12.7 mm×3.2 mm and/or 1.6 mm.

The rods are mounted vertically in such a way that the underside of the test body is located 305 mm above a strip of bonding material. Each test rod is individually ignited by means of two successive ignition processes each of 10 seconds' duration. The combustion properties after each ignition process are observed and the sample then evaluated. A Bunsen burner with a 10 mm (3.8 inch) high blue natural gas flame with a unit of heat of 3.73×104 kJ/m$^3$ (1000 BTU per cubic foot) is used to ignite the sample.

To assess the fire behaviour, a flame is applied to each test body twice, for 10 seconds on each occasion. The smoulder time is measured after the ignition source has been removed. Five test bodies are used for each test and the 10 individual burning times and the sum of the individual smoulder times determined.

The composition of the materials tested and the data obtained are summarized in Table 1 below.

TABLE 1

Composition and properties of the polycarbonate ABS moulding compositions

| Example | 1 Comparison | 2 According to the invention |
|---|---|---|
| Components [parts by weight] | | |
| A | 70 | — |
| A1 and A2 | — | 70: of which A1 85.7 wt. %, A2 14.3 wt. % |
| C | 5 | 5 |
| D | 11 | 11 |
| E | 4 | 4 |
| F | 10 | 10 |
| Properties: | | |
| Vicat B [° C.] | 97 | 96 |
| Notch impact strength [kJ/m$^2$] | 5 | 8 |
| Melt viscosity at 260° C. [Pa · s] | | |
| at 100 s$^{-1}$ | 539 | 440 |
| at 1000 s$^{-1}$ | 275 | 241 |
| at 1500 s$^{-1}$ | 223 | 193 |
| MVR 240° C./5 kg [ml/10 mins] | 16.2 | 17.6 |
| Tensile E modulus [N/mm$^2$] | 3293 | 3349 |
| UL 94 V 3.2 mm/RT | V0 | V0 |
| Total smoulder time [s] | 13 | 4 |
| UL 94 V 1.6 mm/RT | V0 | V0 |
| Total smoulder time [s] | 15 | 9 |

What is claimed is:

1. A flame-proof, reinforced thermoplastic molding composition consisting essentially of:
   A. 5 to 95 parts by weight of a mixture of two aromatic polycarbonates A.1 and A.2 with different solution viscosity, wherein
      1. the relative solution viscosity of A.1 is 1.18 to 1.24,
      2. the relative solution viscosity of A.2 is 1.24 to 1.34 and
      3. the difference between the relative solution viscosities of A 1 and A.2 is not less than 0.06, the relative solution viscosities of A.1 and A.2 being measured in CH$_2$Cl$_2$ at 25°C. and at a concentration of 0.5 g/100ml, wherein one or more further polycarbonates may be added to the mixture of A.1 and A.2;
   B. 0 to 50 parts by weight of vinyl (co)polymer consisting of one or at least two ethylenically unsaturated monomers selected from styrene, α-methylstyrene, ring-substituted styrenes, acrylonitrile, methacrylonitrile, methyl methacrylate, maleic anhydride, N-substituted maleinimides and (meth)acrylatic acid esters with 1 to 18 carbon atoms in the alcohol component;
   C. 0.5 to 60 parts by weight of graft polymer obtainable by graft polymerization of at least two of the monomers selected from chloroprene, butadiene, isoprene, styrene, acrylonitrile, ethylene, propylene, vinyl acetate and (meth)acrylic acid-C$_1$–C$_{18}$-alkyl ester;
   D. 0.5 to 20 parts by weight of phosphorus compound of formula (I)

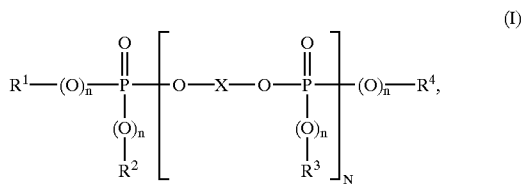

in which
      R$^1$, R$^2$, R$^3$ and R$^4$ independently of each other mean optionally halogenated C$_1$–C$_4$-alkyl in each case, C$_5$–C$_6$-cycloalkyl, C$_6$–C$_{20}$-aryl or C$_7$–C$_{12}$-aralkyl, optionally substituted by halogen and/or C$_1$–C$_4$-alkyl in each case,
      n independently of each other means 0 or 1,
      N means 0 to 30, and
      X means a mono- or polynuclear aromatic group with 6 to 30 C atoms;
   E. 0.05 to 5 parts by weight of at least one fluorinated polyolefin; and
   F. 1 to 40 parts by weight of inorganic reinforcing material selected from glass fibers, cut glass fibers, ground glass fibers and mixtures thereof
   wherein the sum of the parts by weight A, B, C, D, E and F is 100 parts by weight.

2. The molding composition of claim 1, wherein N in formula (I) has a value of 0.3 to 20.

3. The molding composition of claim 1, wherein in formula (I) R$^1$, R$^2$, R$^3$ and R$^4$ independently of each other in each case mean C$_1$–C$_4$-alkyl, C$_6$–C$_{10}$ aryl or phenyl-C$_1$–C$_4$ alkyl in each case optionally substituted with halogen and/or alkyl groups and X is derived from diphenols, selected from bisphenol A, resorcinol or hydroquinone, optionally chlorinated or brominated.

4. The molding composition of claim 1 further consisting essentially of up to 20 wt. %, related to the total molding composition, of at least one further flame-proofing agent that is other than the phosphorus compound represented by formula (I).

5. The molding composition of claim 1, containing 10 to 90 parts by weight of Component A, 1 to 40 parts by weight of Component C, 1 to 18 parts by weight of Component D and 3 to 30 parts by weight of Component F.

6. The molding composition of claim 1, containing 20 to 80 parts by weight of Component A, 2 to 30 parts by weight of Component C, 2 to 15 parts by weight of Component D and 5 to 20 parts by weight of Component F.

7. The molding composition of claim 1, wherein Component B is a (co)polymer comprising B.1 50 to 99 parts by weight of monomer selected from styrene, α-methylstyrene, ring-substituted styrene and/or methyl methacrylate and B.2 1 to 50 parts by weight of monomer selected from acrylonitrile, methacrylonitrile, methyl methacrylate, maleic anhydride and/or N-alkyl or N-aryl substituted maleinimide.

8. The molding composition of claim 1, wherein Component C is a graft polymer, obtainable by graft polymerization of C. 1 5 to 95 parts by weight of a mixture comprising C. 1.1 50 to 99 parts by weight of styrene, α-methylstyrene, halogen or methyl ring-substituted styrenes, methyl methacrylate or mixtures of these compounds and C.1.2 1 to 50 parts by weight of acrylonitrile, methacrylonitrile, methyl methacrylate, maleic anhydride, $C_1$–$C_4$-alkyl and/or phenyl-N-substituted maleinimides or mixtures of these compounds on C.2 5 to 95 parts by weight of polymer based on diene and/or alkyl acrylate with a glass transition temperature below −10° C.

9. The molding composition of claim 1 wherein said molding composition further consists essentially of at least one additive selected from the group consisting of stabilizers, pigments, mold release agents, flow agents and anti-static agents.

10. A molded body produced from the molding composition of claim 1.

11. The molding composition according to claim 1 wherein monophosphorus compound of formula (I) is at least one member selected from the group consisting of tributyl phosphate, tris-(2-chloroethyl)-phosphate, tris-(2,3-dibromopropyl)-phosphate, triphenyl phosphate, tricresyl phosphate, diphenylcresyl phosphate, diphenyloctyl phosphate, diphenyl-2-ethylcresyl phosphate, tri-(isopropylphenyl)-phosphate, halogen-substituted aryl phosphates, methyl phosphonic acid dimethyl esters, methyl phosphonic acid diphenyl esters, phenyl phosphonic acid diethyl esters, triphenyl phosphine oxide and tricresyl phosphine oxide.

12. The molding composition according to claim 1, wherein fluorinated polyolefins E) is at least one member selected from the group consisting of polytetrafluoroethylene, polyvinylidene fluoride, tetrafluoroethylene/hexafluoro-propylene and ethylene/tetrafluoroethylene copolymer.

13. The molding composition of claim 1 further consisting essentially of a finely divided inorganic compound selected from $Al_2O_3$, AlO(OH), zinc borate and mixtures thereof.

* * * * *